Sept. 27, 1949.    M. M. CANNON, JR., ET AL    2,483,333
MOLTEN GLASS LEVEL INDICATOR AND RECORDER
Filed March 21, 1946    3 Sheets-Sheet 2

INVENTORS
Madison M. Cannon Jr.
John S. Light
BY Parham & Bates
ATTORNEYS

Patented Sept. 27, 1949

2,483,333

UNITED STATES PATENT OFFICE 2,483,333

MOLTEN GLASS LEVEL INDICATOR AND RECORDER

Madison M. Cannon, Jr., West Hartford, and John S. Light, Simsbury, Conn., assignors to Hartford-Empire Company, Hartford, Conn., a corporation of Delaware Application March 21, 1946, Serial No. 656,000

14 Claims. (Cl. 73—290)

This invention relates to improvements in apparatus for indicating and/or recording variations in the level of molten glass in a melting tank, forehearth or similar molten glass container.

An object of the invention is to provide a simple and yet highly sensitive, reliable and efficient apparatus which can be readily applied to a glass melting tank, forehearth or similar molten glass container so as automatically to indicate and/or record variations in level of the molten glass therein.

A further object of the invention is to provide an apparatus of the character described in which an electrically conductive element for detecting molten glass level is reciprocated along a vertical path having its lower limit determined by the contact of the element with the surface of the molten glass, and its upper limit determined by the point reached when the thread of glass adhering to the tip of the element is broken, the vertical position of the entire path being varied according to variations in the level of the molten glass.

A further object of the invention is to provide an apparatus of the character described wherein an actuator for an associate mechanism that is useful in connection with the maintenance of the glass at approximately the level desired is operatively connected with the vertically reciprocating glass level detector to move vertically with the latter.

A further object of the invention is the provision in an apparatus of the character described of an actuator that is operatively connected with the vertically reciprocating glass level detector to move therewith and an associate element which will remain stationary in a position related to the level of the molten glass at the preceding level-detecting stroke of such detector so long as the level of the molten glass remains constant and will be shifted in space in the direction and to the same extent as any subsequent change of level of the molten glass as detected by the detector on its next level-detecting stroke following such a change.

In a practical embodiment of the invention, an electrically conductive molten glass contact element is carried by a vertically movable carrier which is operatively connected with a reversible motor, one of the operating circuits for which is completed each time the contact element is lowered to the surface of the molten glass in a melting tank or the like and is maintained until the connecting thread of glass between the then upwardly moving contact and the molten glass has been broken, the other operating circuit for the reversible motor then being automatically completed to reverse the motor and the movement of the contact element. The vertically movable carrier thus will be reciprocated vertically along a path, the level of the lower limit of which is raised or lowered automatically as the level of the molten glass varies. A suitable indicator may be actuated by the vertical movements of the glass contact carrier to show to an attendant whether or not a desired level of glass in the container is being maintained and, if not, the extent and character of the departures therefrom. Also, or alternatively, the vertical reciprocatory movements of the carrier may be utilized to actuate a suitable recorder which will make a permanent record of the variations in the level of the glass in the container. If desired, a batch feeder or other known mechanism for controlling the amount of molten glass in the container may be operatively connected with the contact carrier so as to be suitably actuated or controlled by its vertical reciprocations. This may be in addition to the indicating and recording mechanisms, or in lieu of one or both of them.

The amplitude of the vertical path of reciprocatory movements of the contact element will remain substantially constant despite variations in the level of the lower limit thereof as the glass level changes so long as the operating conditions, such as the temperature, viscosity, and composition of the molten glass of the place of contact remain substantially the same. This amplitude, in a typical operation, may be in the order of a few sixty-fourths of an inch. Any change in any of these operating conditions will cause a change in the amplitude of the upward stroke of the contact element, which change, however, usually will be slight.

In one form of construction contemplated by the invention, a lost motion device is provided for actuating an associate controlled mechanism, specifically an electric recorder, in accordance with variations in the level of the molten glass in the container to which the apparatus has been applied. This lost motion device includes adjustable cooperative parts, the relative positions of which can be adjusted within limits by manual action to permit the vertical reciprocations of the carrier of the glass contact element without actuation of the control part of the associate recorder so long as the glass level and the amplitude of the path of the carrier reciprocations are both unchanged. Should the glass level be changed without a change of the amplitude of the vertical reciprocations of the carrier, the control part of the associate recorder will be actuated by the lost motion device to provide a record of such change without any further adjustment of the lost motion device being required. If, however, the amplitude of the vertical reciprocations of the carrier should be changed, as by a change in the viscosity of the molten glass contacted by the level detecting element, then a corrective adjustment of the lost motion device is necessary to assure actuation of the control part of the associate recorder by the lost motion device with the desired accuracy and sensitivity when the glass level changes. Such adjustments can be made within limits, as aforesaid.

In another form of construction of the invention, an improved form of lost motion device is provided. This is constructed and arranged to be automatically adjusted if required each time the glass level detector has been brought by the reciprocating carrier to the surface of the molten glass pool involved so that the lost motion device will always be set to actuate the control part of the associate mechanism with the desired accuracy and sensitivity whenever the level of such molten glass pool changes and irrespective of a change in the amplitude of the vertical reciprocations of the carrier.

The apparatus of the invention preferably also includes a suitable mechanism to automatically break the operating circuits for the electrically driven parts of the device should the vertical reciprocations of the carrier be abnormal, as because of either an excessive lowering or raising of the level of the glass in the tank or other container to which the apparatus has been applied.

The apparatus of the present invention preferably is also constructed and arranged to permit manual operation thereof, the motor operating circuits then being rendered inactive and the motor driven shaft being turned by a hand wheel to position the detecting element at a point above the glass level or to move it to and from the glass level. A suitable signal is provided to indicate whenthe detecting element makes contact with the glass. This may be a suitable electric signalling device, which may be an incandescent lamp, connected in circuit with the detector to show when the latter makes contact with the glass.

Other objects and advantages of the invention will hereinafter be pointed out or will become apparent from the following description of the aforesaid practical embodiments of the invention, as shown in the accompanying drawings, in which:

Fig. 4 is a diagram of the electrical parts and connections of the apparatus of the preceding views.

Figure 1:
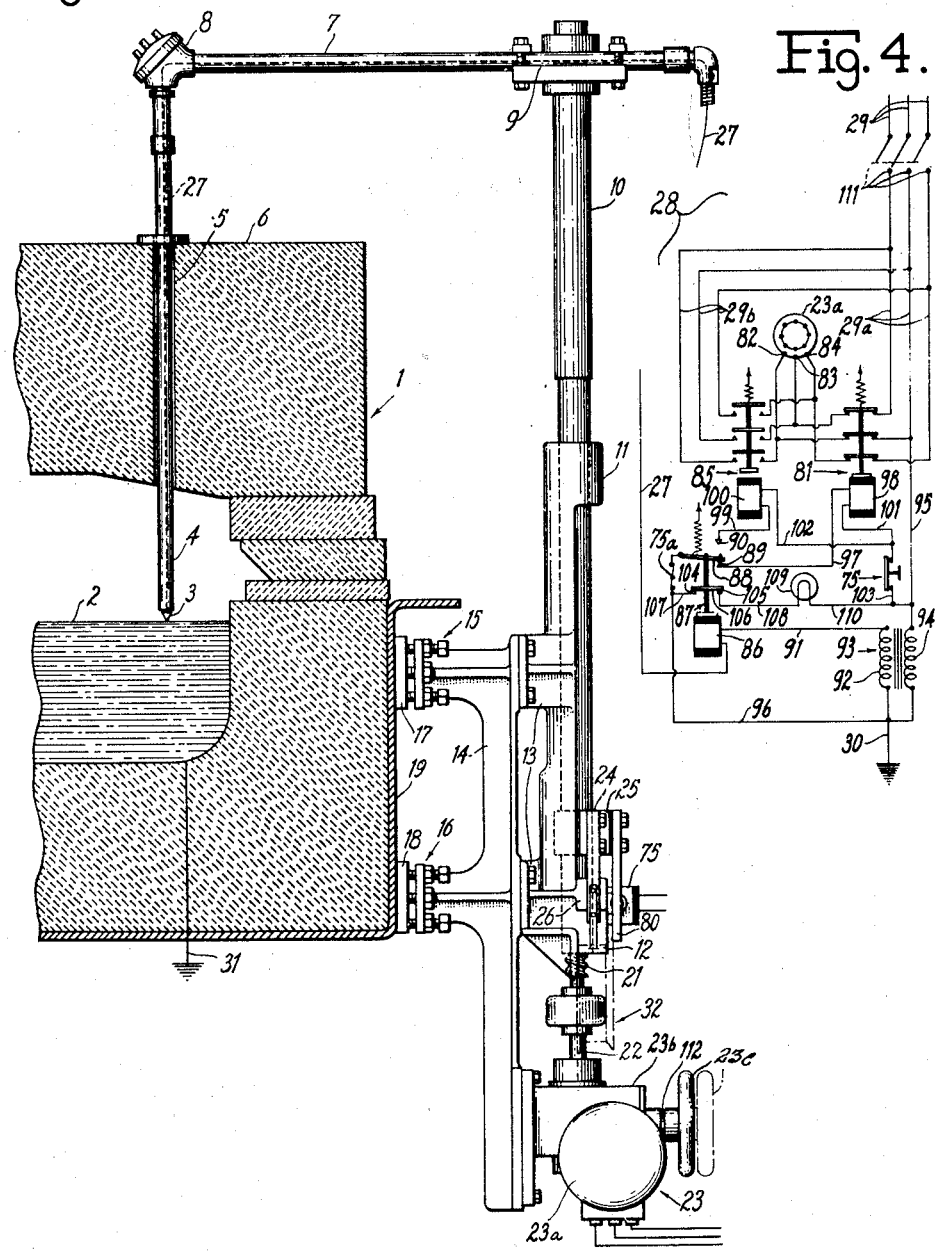
Fig. 1 is a side elevation of one form of our improved glass level indicator and recorder as applied to a portion of a glass melting tank, the latter being shown in vertical section.

Referring now more particularly to Fig. 1, the numeral 1 generally designates a fragmentary portion of a glass melting tank in which there is a body of molten glass 2. An electrically conductive glass contact element is indicated at 3, being a pointed, small piece of platinum or other suitable metal or material affixed as a tip to the lower end of a vertically movable, vertically disposed rod 4 which depends from above through a vertical opening 5 in the refractory top 6 of the melting tank. The rod 4 depends from one end of a horizontal supporting arm 7, which also may be a rod-like member suitably connected to the rod 4, as by an elbow fitting 8. The horizontal supporting member 7 may be mounted near its opposite end, as at 9, upon the upper end portion of a vertically disposed shaft 10. The shaft 10 may be supported for vertical reciprocatory movements in vertically spaced guides or bearings 11 and 12, respectively, on a secondary bracket 13 which is bolted to a main bracket 14. The latter may be fastened, as generally indicated at 15 and 16, respectively, to stationary frame members 17 and 18, which may be parts of or fixed to any suitable supporting structure, such, for example, as the supporting casing 19 of the melting tank.

Figure 2:
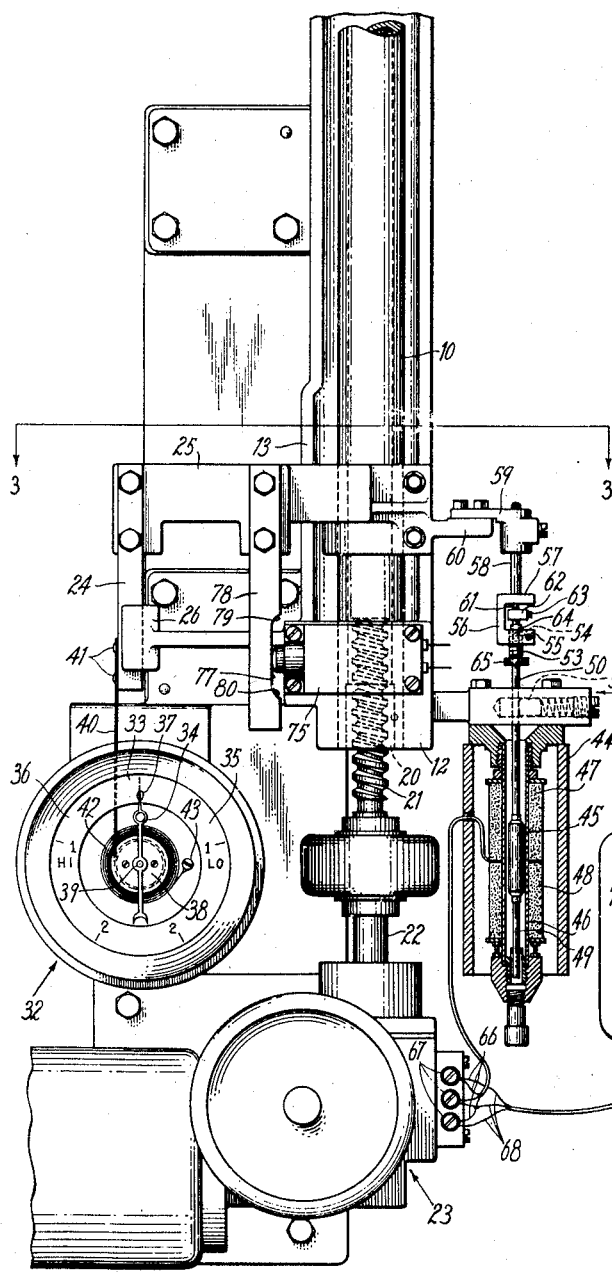
Fig. 2 is a relatively enlarged fragmentary view, mainly in elevation, showing some details of the lever indicator and recorder, a portion of the recorder being shown in vertical section.
Figure 3:
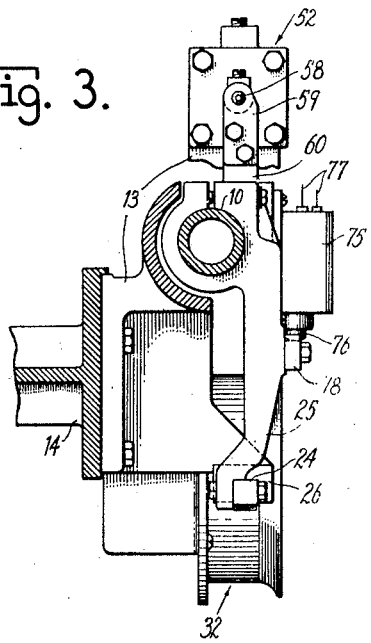
Fig. 3 is a section along the line 3—3 of Fig. 2.

The shaft 10 may be hollow or tubular in form, Figs. 2 and 3, and has a nut 20, Fig. 2, secured thereto in its lower end portion. This nut is threadedly engaged with an upstanding threaded driving shaft 21 which constitutes an upward extension or prolongation of the driven shaft 22 of a suitable reversible motor and speed reduction mechanism, generally indicated at 23 and comprising a motor 23a and a connected reduction unit 23b. The arrangement is such that the threaded shaft 21 will be turned about its axis when the driving mechanism 23 is operating and the direction of its rotation about its axis will be reversed with reversal of the motor 23a. The vertical shaft 10 is prevented from turning about its vertical axis, as by the contact of a vertically movable, vertically disposed guide arm 24, carried by a bracket 25 on the shaft 10, with a stationary cooperative guide 26 on the supporting bracket 13. Consequently, the vertical shaft 10 will be moved axially up and down by the intermittently reversed operations of the driving mechanism 23.

The shaft 10, and the supporting members 7, 8 and 4 carried thereby constitute a carrier for the element 3 (see Fig. 1). The part 4, which depends into the tank and therefore is exposed to relatively higher temperatures, may be made of refractory or of any suitable metal or other material that is sufficiently resistant to heat. The element 3 is employed to complete a circuit for operating the motor 23a in one direction. This element therefore may be connected electrically by a wire 27 extending through the carrier parts 4, 8 and 7, which may be tubular for that purpose, and beyond these parts to a suitable assembly of electrical parts and connections, shown diagrammatically and indicated generally at 28 in Fig. 4. This assembly may be provided with lead wires 29 so as to be supplied with electric current from any suitable source and also may have a ground connection as indicated at 30. The molten glass 2 in the tank may be connected with ground, as indicated at 31, Fig. 1. The wire 27 will be protected by the carrier parts and shielded against harmful heating by the part 4. The electrical parts and connections of assembly 28 will hereinafter be further described.

When the element 3 is in contact with the surface of the molten glass 2, a circuit for operating the motor of the unit 23 obviously will have been completed through the electrical parts and connections of the assembly 28 as presently will be pointed out. The subsequent operation of the driving mechanism 23 will cause the contact element 3 to be raised from the glass and to draw upwardly with it a thin thread of glass (not shown). This thread of glass will be broken when the contact has been raised but a short distance from the glass surface, probably by reason of the attenuation of such thread and the heating thereof by the electric current flowing through it. The distance of upward travel of the contact from the glass surface before the thread breaks will remain substantially constant, so long as operating conditions remain the same and may vary slightly, say a few thousandths of an inch, in consequence of such variations of temperature and viscosity of the glass as are likely to take place under usual operating conditions. The vertical position of the entire path of movement of the element 3 will, of course, be varied as the glass level falls or rises.

The variations in the level of the glass may be shown by a suitable indicator, with which the shaft 10 is operatively connected. An example of such an indicator is shown more or less diagrammatically at 32 in Fig. 2. It includes a dial 33 and a cooperative pivoted pointer 34. One-half of the face of the dial 33 may be provided with suitable graduations to serve as a scale, designated 35, to indicate variations in a "low" or downward direction of the level of the glass in the melting tank. The remaining one-half portion of the face of the dial may be suitably graduated to serve as a similar scale, designated 36, to show rises in the level of the glass, the starting point of both scales being the "zero" graduation indicated at 37, at the top of the face of the dial. Thus, when the glass level detecting contact or "feeler" 3 is at the lower limit of its downward stroke, i. e., has arrived at the surface of the glass in the tank 1, and the level of the glass in the tank is that which it is desired to maintain, the pointer 34 may point to the "zero" graduation. The indicator 32 is provided with a rotary spool or hub 38 with which the pointer 34 is arranged to turn about the axis of its pivotal shaft 39. A tape 40 is connected at one end, as at 41, to the vertically movable guide rod 24 and is wound around a portion of the spool 38, the other end of the tape, of course, being fastened to the spool in any conventional manner. A coil spring 42 is connected at one end, as at 43, to a stationary part of the indicator dial 32 and is wound around a portion of the spool, the opposite end of the spring, like that of the tape, being fastened to the spool in any suitable known way. The arrangement is such that the spring will yieldingly oppose the pull of the tape on the spool and pointer as the arm 24 is moved upward and will return the pointer to any position permitted by the tape 40 when the arm 24 moves downward.

If the level of the glass in the tank remains constant, and is that which is indicated by the setting of the pointer at the "zero" mark 37, each upward movement of the contact 3 will cause the pointer of the indicator to swing in a clockwise direction from the "zero" graduation and the succeeding downward movement of the contact element 3 will be attended by a like movement of the arm 24 so that the spring 42 of the indicator may cause a return or counter-clockwise swinging movement of the pointer to the "zero" position. However, if the level of the glass has fallen, the pointer will swing past the "zero" graduation to a new starting point on the "low" scale. Similarly, if the level of the glass has risen, the pointer will be stopped by the tape before it reaches the "zero" graduation so as to have a new starting point on the "high" side of the dial. The extent of the clockwise movement of the pointer will indicate the extent of the upward stroke of the glass contact 3.

The recorder for making a permanent record of the variations in the level of the glass now preferred by us is an electric recording meter which, except for the features of construction and operation hereinafter particularly pointed out, is substantially like the Cochrane flow meter shown and described on pages 10 and 11 of Publication 3010, entitled "Flow meters by Cochrane," copyright 1941 by Cochrane Corporation, Philadelphia, Pennsylvania. The recorder of our illustrative apparatus comprises a transmitter 44, Fig. 2, including a vertically movable iron core 45 located in a vertically disposed tube 46 which is encircled by two cooperative, closely adjacent, vertically aligned reactance coils 47 and 48, respectively. The magnetic core 45 has a lower, suitably guided, depending, guide stem 49 and an upper, upwardly projecting, actuating stem 50. A spring-pressed braking element 51 is mounted by a structure generally indicated at 52 to bear against one side of the actuating stem 50 to prevent any unintended or accidental vertical movement of the core 45 from any position within the coils 47 and 48. The friction between the braking member 51 and the core-actuating stem 50 is not sufficient to prevent axial movement of the core when the actuating stem is subjected to a force tending to move it longitudinally by means which will now be described.

The upper portion of the actuating stem 50 extends slidably through a short externally screw-threaded sleeve 53, Fig. 2, which is in threaded engagement with the threaded wall of a vertical opening 54 in the lower arm 55 of a yoke 56, the upper arm of which, designated 57, is carried by the lower end of a vertical rod 58. The rod 58 is carried adjustably by an arm 59 of a bracket 60 which is mounted on the vertical shaft 10 to move vertically with the latter. The arrangement is such that the upper end of the actuating stem 50, which may be pointed as indicated at 61, may contact with the lower surface of the upper arm 57 of the yoke 56 directly beneath the supporting rod 58 and as shown in Fig. 2. This is a condition which may exist when the glass contact element 3 is at the lower limit of its stroke or, in other words, has just reached the surface of the glass in the melting tank. At this time, a block 62 which has been secured in an adjusted position on the portion of the actuating stem 50 between the yoke arms, as by means of a set screw 63. is located a short distance above the upper end of the protruding, reduced upper end portion 64 of the adjustable threaded sleeve 53. The extent of this spacing between the upper end of the part 64 and the block 62 may be varied by adjusting the position of the sleeve 53 in the lower arm 55 of the yoke 56. For convenience in making this adjustment, the sleeve 53 may be provided with a peripherally knurled flange 65.

The operation of the parts just described will be readily understood. As the shaft 10 is moved upward, the yoke 56 will be moved with it without lifting the magnetic core 45 unless and until the upper end of the sleeve 53 has first been raised against the block 62. There also will be lost motion between the yoke and the core stem 50 on the return or downward movement of the shaft 10 unless and until the upper arm of the yoke 56 has been lowered against the upper end of such stem.

The adjusted or pre-set relative positions of the yoke 56, the upper striking or abutment surface of the threaded sleeve 53 in the lower yoke arm 55 and the block 62 on the stem 50 preferably are such for any given set of operating conditions and a given desirable level of molten glass in the container 1 that the lower striking or abutment surface of the upper yoke arm 57 will just contact the upper end of the stem 50 at the end of each downward stroke of the yoke without imparting motion to the stem, the core of the transmitter 44 then being in its intermediate or neutral position and the upper surface of the sleeve 53 will just contact the block 62 without imparting motion thereto at the end of each upward stroke of the yoke. This condition will endure so long as both the glass level and the operating conditions remain unchanged. If the glass level falls, the upper arm of the yoke will strike the upper end of the stem 50 before the downward stroke of the yoke has ended and will depress the stem and the transmitter core. If the glass level should rise, the downward motion of the yoke will cease before the upper yoke arm strikes the upper end of the stem but, on the succeeding upstroke of the yoke, the upper end of the sleeve 53 will strike the block 62 and raise the stem and the transmitter core. The lost motion device just described therefore is sensitive to any change of level of the molten glass and will accurately reflect such changes without further adjustment after having been put in operation so long as operating conditions remain the same. Should a change in the amplitude of the reciprocatory strokes of the yoke be brought about by a change of operating conditions, as a change in the temperature and viscosity of the molten glass, then an adjustment of the position of the sleeve 53 or of the block 62 or of the positions of both may be necessary to restore the hereinbefore described desirable relative positions of the relatively moving parts of this lost motion device. These adjustments can be made within limits. The amplitude of the reciprocations of the reciprocating parts of this lost motion device also must not exceed a predetermined limit.

The reactance coils 47 and 48 are connected electrically by wires 66, posts 67 and wires 68 with a Cochrane recording receiver, which is indicated generally at 69. This receiver includes a slowly rotating chart 70 with which a laterally swingable pivoted pen or stylus 71 is arranged to cooperate. The surface of the slowly rotating chart 70 is divided appropriately by concentric circular lines 72 and intersecting other lines 73. Thus, when the pen or stylus 71 produces a line on the rotating chart following or parallel with one of the circular lines 72, this will indicate that a certain level of glass in the tank has been maintained substantially constant. The magnetic core of the transmitter then may be in its centered or neutral position intermediate the length of the combined reactance coils 47 and 48 as shown in Fig. 2. It will be understood that when the magnetic core is in this position, the pen or stylus 71 will not be swung laterally relative to the underneath rotating chart. However, a rise or fall of level of the glass in the tank, attended by a vertical movement of the magnetic core relative to the reactance coils, will cause the pen or stylus 71 to be swung laterally so that the line marked on the chart, such as the line indicated at 74, will be irregular and will show the character and extent of the departures in the level of the glass from a particular level as from that represented by the adjacent circular line 72.

Any other suitable recorder may be used in lieu of that shown in the accompanying drawings and herein described. Also, the reciprocations of the hereinbefore described parts which are employed to actuate the recorder may be used to actuate or control the operations of any other suitable known mechanism, such as a batch feeder, to produce results which are useful in the maintenance of a desired level of glass in the tank.

The apparatus provided by the invention may include a safety device for stopping the operations of the driving mechanism 23 and, hence, the vertical reciprocations of the glass contact carrier should there be an excessive rise or fall of the level of the glass in the tank. A normally closed electric switch 75, Figs. 2 and 3, has a normally projected push button control member 76. This switch is mounted on a stationary support adjacent to the vertically reciprocatory shaft 10, Fig. 1, being affixed to the secondary bracket 13 so that the outer end of the push button control 76, which may be rounded as shown, projects into a longitudinally extending recess 77, Fig. 2, in a depending arm 78 on the bracket 25. The bracket 25 is carried by the vertically movable shaft 10 as hereinbefore pointed out, so that the pendent arm 78 will be moved vertically relative to the push button 76 by the vertical reciprocations of the shaft 10. The opposite ends of the longitudinal recess 77 are formed to provide upper and lower cam surfaces 79 and 80, respectively. Normally, the switch push button does not contact with either one of these cam surfaces. However, an excessive rise or fall of the level of the glass in the tank will cause one of these cam surfaces to contact with and push the button 76 back into the switch 75, thereby opening the latter. The switch is operatively connected with power connections of the electrical assembly 28, as hereinafter described, so that opening of the switch will prevent operation of the driving mechanism 23 until an attendant has taken the necessary steps to correct the cause of the excessive change in the level of the glass and has re-established conditions suitable for resumed operation of our apparatus.

The assembly 28 of electrical parts and connections, Fig. 4, comprises the power lines 29 which respectively are divided into the branch lines 29a and 29b. The branch lines 29a may be connected operatively through a magnetic switch 81 with the terminals 82, 83 and 84, respectively, of the motor 23a which, in this assembly, is a three phase, squirrel cage, induction motor. The branch lines 29b may be operatively connected through a similar magnetic switch 85 with the same motor terminal connections but, of course, in the reverse order and at a different time. When power is being supplied to the motor 23a from the lines 29a, the switch 81 then being closed as shown in Fig. 4, the motor will be operating in one direction. This is the condition that exists when the glass level detecting contact 3 has contacted the glass of the pool as shown in Fig. 1 and the motor then will be operating in the direction to raise the contact 3 from the glass. When power is being supplied from the lines 29b, the magnetic switch 85 then being closed and the switch 81 open, the motor will be operating in the reverse direction and the contact 3 will be lowered.

The electrical means for closing the switches 81 and 85, which normally are open may comprise the following parts and connections. The wire 27 from the glass level detecting contact 3 extends to the solenoid 86 of a magnetic switch 87 having a pivoted switch arm 88 positioned to cooperate with one or the other of spaced contacts 89 and 90 according to whether the solenoid 86 has been energized or is de-energized. The solenoid 86 is connected by a wire 91 with one side of the secondary coil 92 of a transformer 93. The secondary coil 92 is connected at 30 to ground. The primary 94 of the transformer is supplied with current by a wire 95 which may take current from one of the branch power lines 29a. The primary 94 is connected by a wire 96 with the switch arm 88. The switch contact 89 is connected by a wire 97 with the solenoid 98 of the switch 81. The switch contact 90 is connected by a wire 99 with the solenoid 100 of the switch 85. The solenoids 98 and 100 are connected by the wires 101 and 102, respectively, with one side of the normally closed aforesaid safety switch 75. The other side of that switch is connected by a wire 103 with the aforesaid power line 95.

When the glass level detecting contact 3 makes contact with the molten glass of the pool 2, a circuit for energizing the solenoid 86 of the switch 87 will be closed through ground and will cause the switch arm 88 to move into engagement with the contact 89. If the safety switch 75 is closed, a circuit for energizing the solenoid 98 of the switch 81 will be completed and the consequent closing of the switch 81 will complete the first of the motor operating circuits hereinbefore referred to. When the glass connection between the contact 3 and the pool 2 has broken, the solenoid 86 will be de-energized, the switch arm 88 will be moved into engagement with the contact 90, the switch 85 will be closed and the second of the motor operating circuits hereinbefore mentioned will be completed.

The switch 87 includes also a pair of spaced contacts 104 and 105, respectively, and a movable switch member 106 cooperative therewith. The contact 104 is connected by a wire 107 with the wire 96. The contact 105 is connected by a wire 108 with one side of an electric signal, specifically an incandescent lamp 109, the other side of which is connected by a wire 110 with the wire 103 and thence to the power line 95. Consequently, the electric signal 109 will be energized each time the switch 87 is closed and this will be each time the level detecting contact 3 makes contact with the molten glass in the pool.

A triple-pole throw switch 111 may be provided in the power lines 29 to open them when desired.

The electrical connections and parts of the assembly 28 as hereinbefore described are in general conventional and therefore have been shown diagrammatically. Any other suitable arrangement of electrical control parts and connections may be employed in lieu of that shown and described.

As shown in Fig. 1, the driving mechanism 23 is provided with a hand wheel 23c, mounted on a projecting shaft 112, and normally occupying an idle position as shown by the full lines when the motor 23a is operating. However, when the motor has been rendered inactive, as because of an excessive rise or fall of level of the molten glass in the container 1 and consequent opening of the safety switch 75 as hereinbefore described, or in any other way, as by manual opening of the normally closed switch 75a, Fig. 4, the hand wheel 23c and its supporting shaft may be pulled outward until the hand wheel is in the dotted line position, whereupon turning of the hand wheel manually will effect turning of the driven element of the mechanism 23 and raising or lowering by manual action of the vertically movable glass contact carrier according to the direction of turning of such hand wheel. This feature of the driving mechanism 23 is a conventional part of such a mechanism and may be used to re-set the vertically movable parts of the apparatus preliminary to resumption of automatic operations after an excessive rise or fall of the glass level or for detection of the glass level by manual action while the motor is not in use. During such an operation, sufficient electrical connections are left in use to cause energization of the electric signal 109 each time the glass level detector 3 makes contact with the molten glass.

Figure 5:
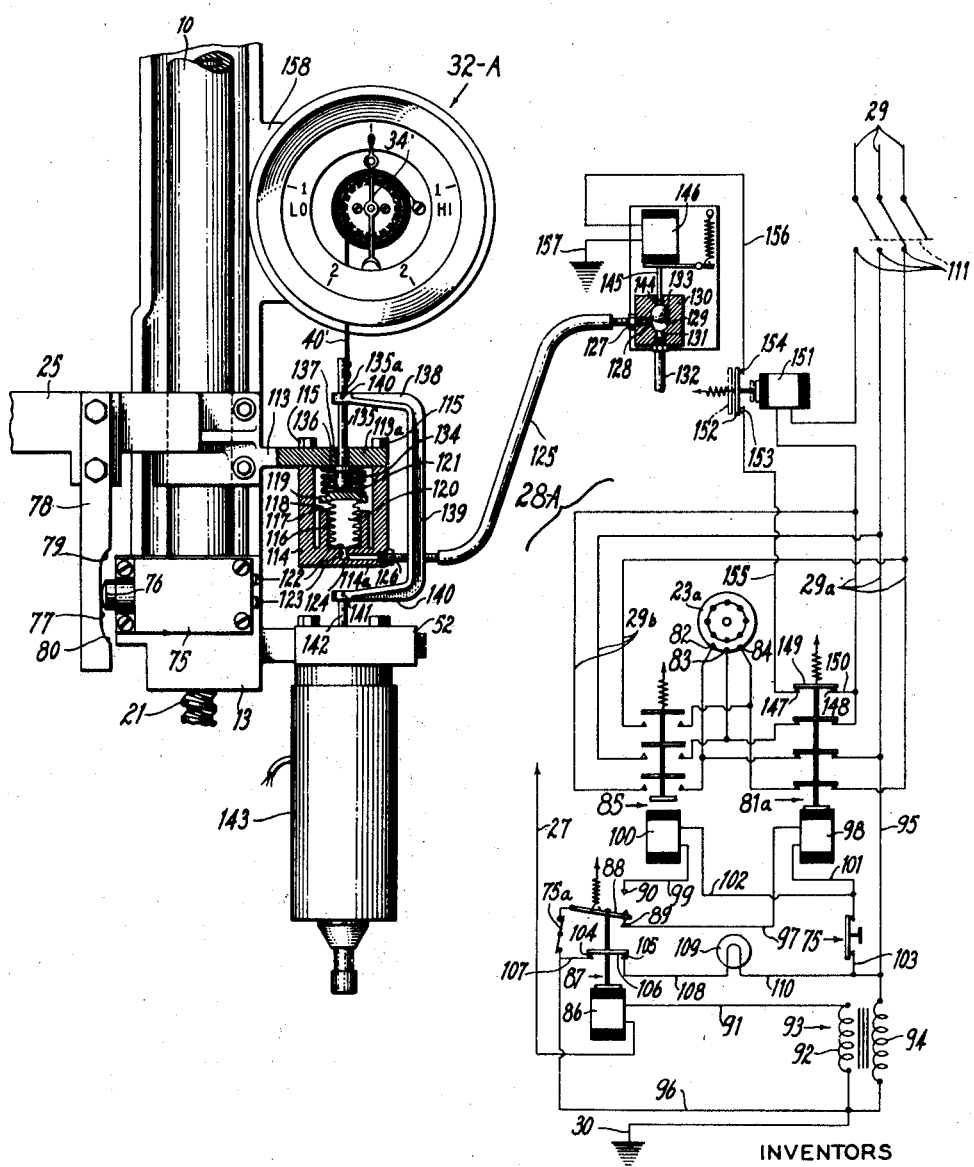
Fig. 5 is a view showing, mainly in elevation and partly in section, a fragmentary part of our level indicator and recorder as provided with our improved lost motion device, the view also including a diagram of suitable electrical parts and connections.

In the form of construction partially shown in Fig. 5, the vertically reciprocable carrier shaft 10 carries a laterally extending bracket arm 113 having a substantially flat portion, designated 113a, which constitutes the top member or head of a box-like casing 114. The latter is carried by the bracket 113, being attached by cap bolts 115 or other suitable fastening means to the head 113a. The casing 114 is formed to provide in its lower portion an open-topped central vertical pocket or chamber 116 adapted to accommodate the vertically disposed, flexibly walled, vertically distensible and collapsible, substantially cylindrical, hollow body 117 of an air motor generally designated 118. The power-applying element or piston of this air motor is a closure plate 119 carried by and fastened to the upper end of the hollow body 117 so as to hermetically seal the space 120 within such hollow body at the upper end of the latter. A coil spring 121, under compression, is interposed between the plate 119 and the casing head 113a and serves to yieldingly oppose upward expansion of the hollow, flexibly walled body 117 from a downwardly collapsed condition. The hollow body 120 is provided with an intake port 122 in its bottom in register with the upturned inner end 123 of a combined pressure fluid supply and exhaust passage 124 in the bottom wall 114a of the casing 114. A combined pressure fluid supply and exhaust tube 125 is operatively connected at one end at 126 to the outer end of the passage 124 and at its opposite end at 127 to a port 128 which extends laterally from a central chamber 129 in a valve block 130 through a side wall of the latter. The chamber 129 is connected by a bottom port 131 with a pressure fluid supply pipe 132. The lower portion of the valve chamber 129 is shaped to serve as a seat for a ball valve 133. This ball valve is shown in Fig. 5 in a raised position in which it will allow a fluid under pressure, such as compressed air, to pass from the pipe 132 through the chamber 129 to the port 128 and thence through the tube 125, passage 124, 123, and port 122 to the space 120 within the body 117 of the air motor 118. The latter, as will be clear from the foregoing description thereof, is of a bellows type of construction. The fluid under pressure thus delivered to the interior of the body 117 will tend to lift the member 119 against the resistance of the spring 121 and by pressure against the lower end of the relatively enlarged lower end portion 134 of a vertically disposed rod 135 lift the latter until a flange 136 on the rod at the upper end of the portion 134 thereof bears against the lower surface of the casing head member 113a if the rod has not already been lifted to this position. The rod 135 extends slidably through a vertical opening 137 in the casing head member and is carried by the upper arm 138 of a yoke 139, being fixedly attached to such arm, as at 140, and having an upper end portion 135a projecting above the arm for a purpose to be presently stated. The yoke 139 has a lower arm 140 fixedly attached at 141 to the upper end of an upstanding stem 142. The stem 142 is the core-actuating stem of the transmitter 143 and corresponds to the stem 50 of the transmitter 44 shown in detail in Fig. 2 and hereinbefore described in detail.

When the ball valve 133 is moved downward from its raised position, shown in Fig. 5, to its seat, it will shut off flow of pressure fluid from the pipe 132 to the valve chamber and exhaust of pressure fluid from the space 120 within the collapsible body 117 may occur. This exhaust may be to the valve chamber 129 above the ball valve and thence through an opening 144 extending from the upper part of the valve chamber through the top of the valve body 130 and through which a stem 145 for lifting and lowering the ball valve may extend. The stem 145 may be operated by a solenoid 146. The period of application of pressure fluid to the air motor 118 may be brief and novel provision is made accordingly to effect energization of the solenoid 146 to raise the stem 145 and ball valve 133 for only a brief period but at the proper time. When the solenoid 146 is deenergized or not sufficiently energized, the ball valve will be lowered. When exhaust of pressure fluid from the collapsible body 117 can take place, the spring 121 will collapse it downwardly and away from the lower end of the rod 135. The rod 135, since it is fixedly connected with the amplifier core-actuating stem 142, will remain stationary at any level to which it has been moved until it is moved positively upward or downward by means which hereinafter will be further described.

The form of apparatus partially shown in Fig. 5 includes an assembly of electrical parts and connections, generally designated 28—A, which includes parts and connections like those of the assembly 28 of Fig. 4, and therefore designated by the same reference characters, and, in addition includes parts and connections which will now be particularly pointed out. In the assembly 28—A, a magnetic switch 81a, which otherwise is like the switch 81 of assembly 28, includes a pair of additional spaced contacts, designated 147 and 148, respectively, and a switch bar 149, operated by the solenoid 98 and cooperative with these contacts. A wire 150 connects the contact 148 with one of the branch power lines 29a. A solenoid 151 is interposed in one of the main power lines of the assembly and operates a switch bar 152 which is cooperative with spaced contacts 153 and 154, respectively. A wire 155 connects the contact 147 and the contact 153. A wire 156 connects the contact 154 with the solenoid 146 for operating the ball valve 133. The operating circuit for the solenoid 146 includes a connection 157 to ground.

The solenoid 151 will be ineffective to move the switch bar 152 from its open, circuit breaking position as shown by the dot-and-dash lines during operation of the motor 23a to raise or lower the glass level detecting contact of the apparatus. However, when the motor is reversing because of breaking of the previous operating circuit when the level detecting contact has been lowered to the surface of the glass, a surge of electric current from the power lines to the motor to reverse it will occur as a usual incident in the operation of such a motor. During this surge of current which, of course, is of very brief duration, the solenoid will be supplied with sufficient current to render it effective to retract the switch bar 152 against the contacts 153, 154. Since the switch 81a will also be closed at that time, the solenoid 146 will be energized briefly to raise the ball valve 133 to the position shown in Fig. 5, whereupon a puff of pressure fluid will be supplied to the bellows-like body 117 of the air motor 118. If the level of the glass pool has risen meanwhile so that the upper actuating part 113a of the Fig. 5 form of lost motion device is halted before it has been lowered against the flange 136 of the actuated rod 135 of that device, the upward stroke of the lower actuating part 119, as the pressure fluid within the body 117 expands it upwardly, will cause lifting of the rod 135 and the parts connected therewith until the flange 136 has been raised against the part 113a. The rise of level will, of course, be shown by the change effected in the line that is being made by the associate recorder. If the glass level had not changed, then the part 113a will stop at the same level, i. e., against the flange 136, and there will be no upward movement of the rod 135 in consequence of the delivery of the pressure fluid to the hollow body 117. The line being made by the recorder will then continue as before. If the glass level had fallen, the part 113a will continue downward below its former position and after contact with the flange 136, thereby pushing the rod 135 downward and causing a change in the line that is being made by the recorder. The spring 121 will collapse the hollow body 117 in a downward direction after each application of pressure fluid to the latter so that the casing 114 may move upward with the carrier of the glass level detecting contact without altering the position of the rod 135.

In the form of apparatus shown in Fig. 5, an indicator 32—A, generally like the indicator 32 of the Fig. 2 form of apparatus, may be provided and may be mounted on a stationary part 158 of the framework of the apparatus in a position suitably related to the rod 135 to permit operative attachment of the upper part 135a of the rod 135 to the tape 40' for moving the pivoted pointer 34' of the indicator. In this set-up, the pointer 34' will remain stationary on the dial of the indicator until the level of the glass has changed and then will be moved by the resultant movement of the rod 135 so as to indicate a lowering of the level when the rod 135 is depressed and a relative raising of the level when the rod 135 is lifted.

Numerous changes in and modifications of the illustrative embodiments of the invention shown in the accompanying drawings and herein particularly described may readily be made by those skilled in the art. We, therefore, do not wish to be limited to the details of these embodiments.

We claim:

1. In apparatus of the character described, an electrically conductive element adapted for contact with molten glass and to draw a thread of glass therefrom on movement away from such glass, a carrier for said contact element mounted to move said contact element toward and away from the surface of a body of molten glass in a tank or the like, said carrier including an axially movable, vertically disposed shaft, carrier operating means comprising an electric motor operatively connected with said shaft to move it axially in one direction when the motor is driving in one direction and in the opposite direction when the motor has been reversed and electric circuit forming means including said contact element to operate said motor when said contact element touches the surface of said body of molten glass to effect movement of said contact element away from said surface and to reverse said motor on breakage of the thread of glass drawn by said contact element on such movement, and a lost motion device comprising an actuating part connected to said shaft to move vertically therewith, a second movable part positioned to be moved vertically by the actuating part each time said contact element touches the surface of said body of molten glass at a level different from that of its immediately preceding contact therewith and to be unmoved by said actuating part when said contact element touches said surface at approximately the same level on successive glass contact movements thereof and is moved away from said surface a distance that is substantially constant for its glass thread-drawing movements, and means to effect a relative positioning adjustment of parts of the lost motion device to obviate moving of said second part by the actuating part should operating conditions change so as to produce a change in the amplitude of the stroke of the contact element away from the surface of the body of molten glass without a corresponding change of level of said surface.

2. Apparatus as recited in claim 1 and, in combination therewith, a normally closed switch included in said motor operating electric circuit forming means, and means connected to move with said contact carrier relative to said switch and in such a position in the respect to the latter as to open said switch on an excessive change vertically in either direction of the position of the path of operating movements of said contact carrier.

3. Apparatus as recited in claim 1 and, in combination therewith, a recording mechanism comprising an electrical transmitter including a pair of aligned reactance coils, a magnetic core mounted for axial movements within and relative to said coils, means operatively connecting said core with said second movable part of the lost motion device to position said core in a position intermediate the opposite ends of said coils when the contact of said contact element with the surface of the body of molten glass is at a predetermined level and to move said core axially further into one or the other of said coils when said contact of the contact element with said surface is higher or lower than said predetermined level and an electric recording receiver operatively connected with said reactance coils to record the direction and extent of axial movements of said magnetic core from its said intermediate position in said coils, substantially as and for the purpose described.

4. Apparatus as recited in claim 1 and, in combination therewith, a recording mechanism comprising an electrical transmitter including a pair of aligned reactance coils, a magnetic core mounted for axial movements within and relative to said coils, means operatively connecting said core with said second movable part of the lost motion device to position said core in a position intermediate the opposite ends of said coils when the contact of said contact element with the surface of the body of molten glass is at a predetermined level and to move said core axially further into one or the other of said coils when said contact of the contact element with said surface is higher or lower than said predetermined level and an electric recording receiver operatively connected with said reactance coils to record the direction and extent of axial movements of said magnetic core from its said intermediate position in said coils, and yieldable means acting on said core to tend to maintain it in any position in said coils to which it has been moved.

5. Apparatus as recited in claim 1 wherein said means to effect a relative positioning adjustment of said parts of the lost motion device comprises a threaded member manually adjustable toward and away from said actuating part.

6. Apparatus as recited in claim 1 wherein said means to effect a relative positioning adjustment of said parts of the lost motion device comprises an air motor having a piston acting automatically in synchronism with the glass contact movements of said detecting element to urge said second part of the lost motion device toward the actuating part thereof.

7. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising an actuating part operable by the means to reciprocate said detecting element so as to be reciprocated vertically in unison with the detecting element, a normally stationary, movable part positioned in cooperative relation to said actuating part to be moved vertically by the latter in accordance with changes of the level of the surface of said body of molten glass and to be unmoved by said actuating part when said level remains unchanged, said second-named part being adapted to actuate an associate mechanism when moved by said actuating part, and means to effect a relative vertical positioning adjustment between said actuating part and said second-named part of said lost motion device.

8. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising a yoke having a pair of vertically spaced arms connected to move vertically in unison with said detecting element, the lower of said arms having a vertical opening formed therein, an adjusting sleeve threadedly engaged with the wall of said opening and adjustable to project a limited variable distance above said lower arm, a vertically movable rod extending slideably through said sleeve so as to project above the latter toward the upper arm of said yoke and an abutment element adjustably mounted on said rod between the arms of said yoke, and means acting on said rod to yieldably maintain it in any vertical position to which it has been moved by a contact of said sleeve with said abutment element or a contact of the upper arm of the yoke with the upper end of said rod as said yoke is reciprocated vertically, said rod being adapted to actuate an associate mechanism by its vertical movements.

9. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising a casing connected to move vertically in unison with said detecting element, said casing having a vertical opening in its top, a vertically disposed rod mounted to depend through said vertical opening into said casing and to move vertically from any previously assumed position only when positively impelled upward or downward, an abutment element on the portion of said rod within said casing in position to be struck by the top of said casing to cause a downward movement of said rod in accordance with a lowering of the level at which said detecting element touches the surface of said body of molten glass at the end of a downstroke thereof, and pneumatic rod-position adjusting means in said casing constructed and arranged to move said rod upward at the conclusion of each downward glass-level-detecting stroke of the detecting element until said abutment element on the rod has been raised against the top of the casing if not already in that position and then to permit an upward movement of said casing relative to said rod without changing the position of the latter.

10. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising a casing connected to move vertically in unison with said detecting element, said casing having a vertical opening in its top, a vertically disposed rod mounted to depend through said vertical opening into said casing and to move vertically from any previously assumed position only when positively impelled upward or downward, an abutment element on the portion of said rod within said casing in position to be struck by the top of said casing to cause a downward movement of said rod in accordance with a lowering of the level at which said detecting element touches the surface of said body of molten glass at the end of a downstroke thereof, an air motor in the casing having a piston movable upward to lift said rod until said abutment element contacts the top of the casing when the latter is at the lower end of its downward stroke if said abutment is not already in that position and then to move downward clear of said rod, and operating means for said air motor.

11. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising a casing connected to move vertically in unison with said detecting element, said casing having a vertical opening in its top, a vertically disposed rod mounted to depend through said vertical opening into said casing and to move vertically from any previously assumed position only when positively impelled upward or downward, an abutment element on the portion of said rod within said casing in position to be struck by the top of said casing to cause a downward movement of said rod in accordance with a lowering of the level at which said detecting element touches the surface of said body of molten glass at the end of a downstroke thereof, a vertically disposed air motor in the casing, a piston included in said air motor and arranged to be moved upward when air under pressure is supplied to the air motor to lift said rod until said abutment element contacts the top of the casing when the latter is at the lower end of its downward stroke if said abutment is not already in that position, spring means interposed between said piston and the top of said casing to effect return downward movement of said piston when air under pressure is not being supplied to the air motor, an air supply and exhaust conduit operatively connected to said air motor, a solenoid valve controlling said conduit and adapted, when energized, to supply air under pressure thereto and to permit exhaust of air therefrom at all other times, and electrical means to effect energization of said solenoid valve only when said glass-level-detecting element is reversing after each downward stroke thereof.

12. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising a casing connected to move vertically in unison with the detecting element, said casing having a vertical opening in its top, a vertically disposed rod mounted to depend through said vertical opening into said casing and to move vertically from any previously assumed position only when positively impelled upward or downward, an abutment element on the portion of said rod within said casing in position to be struck by the top of said casing to cause a downward movement of said rod in accordance with a lowering of the level at which said detecting element touches the surface of said body of molten glass at the end of a downward stroke thereof, a pneumatic rod-position adjusting means in the casing constructed and arranged when supplied with air under pressure to lift said rod until said abutment element contacts the top of the casing when the latter is at the lower end of its downward stroke if said abutment is not already in that position, an air supply and exhaust conduit operatively connected to said rod-position adjusting means, a solenoid valve controlling said conduit and adapted, when energized, to supply air under pressure thereto and to permit exhaust of air therefrom at all other times, and electrical means to effect energization of said solenoid valve only when said glass-level-detecting element is at rest after each downward stroke thereof to the surface of said body of molten glass, said last named means including a reversible, induction motor included in said means to reciprocate said glass detecting element and electrical circuit forming means, including said glass-level-detecting element, to operate said motor alternately in relatively reversed directions, and other electrical parts and connections operatively connecting said solenoid valve with said circuit forming means to energize said solenoid valve only when there is a surge of additional current to the motor to reverse it to raise said detecting element from the glas surface after each downward level-detecting stroke of said element.

13. In apparatus of the character described, a vertically movable glass detecting element, means to reciprocate said element vertically to move it repeatedly downward to the surface of a body of molten glass and then upward therefrom so that the lower limit of each downward movement of the detecting element varies directly with the level of said surface, and a lost motion device comprising an actuating part connected to move vertically in unison with said detecting element, a cooperative vertically movable, normally stationary second part in position in relation to the actuating part to be struck and moved downward by the actuating part in accordance with a lowering of the level at which said detecting element touches the surface of said body of molten glass at the end of a downstroke thereof, and means constructed and arranged to act automatically at the conclusion of each downward glass-level-detecting stroke of the detecting element to raise said second part relative to the actuating part to restore said cooperative position relationship of said parts whenever said relationship has been altered by a raising of the level of the lower limit of a downward movement of the detecting element, due to a rise in the level of the surface of the body of molten glass.

14. In an apparatus of the character described, a lost motion device comprising a vertically movable, normally stationary, component part of the device positioned in space at a level corresponding to the level of the surface of a body of molten glass, an actuating part reciprocating vertically above the first named part in correspondence with the movements of a vertically reciprocating glass level detecting element moving up and down between the surface of said body of molten glass and a higher level so that said actuating part will stop in contact with said first named part without moving it downward on each downward movement of the actuating part so long as the level of the glass is unchanged and will stop at a higher level above the first named part at the conclusion of the next downward movement thereof after a rise of level of the surface of said glass body, and means acting automatically to then raise said first named part to said higher level to re-position it against the actuating part at that level.

MADISON M. CANNON, Jr.
JOHN S. LIGHT.

REFERENCES CITED

The following references are of record in the file of this patent:

UNITED STATES PATENTS

| Number | Name | Date |
|---|---|---|
| 1,855,757 | Harrison | Apr. 26, 1932 |
| 2,032,016 | Hitner | Feb. 25, 1936 |
| 2,053,938 | Barker | Sept. 8, 1936 |
| 2,380,436 | Holdman | July 31, 1945 |